TELEVISION VIEWFINDER MARKER SIGNAL GENERATORS

Filed Jan. 9, 1956

INVENTOR.
GLEN L. AKINS
BY Harry R. Lubcke
AGENT 2,952,738

Patented Sept. 13, 1960

2,952,738

TELEVISION VIEWFINDER MARKER SIGNAL GENERATORS

Glen L. Akins, 10733 Keswick, Sun Valley, Calif.

Filed Jan. 9, 1956, Ser. No. 557,879

5 Claims. (Cl. 178—7.5)

Figure 1:
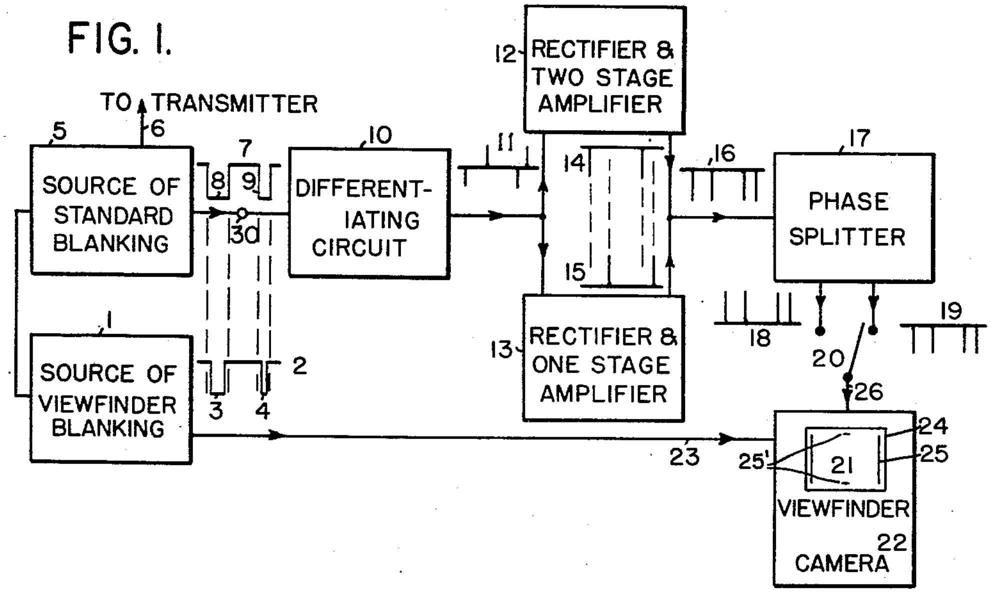

My invention relates to forming pulses in connection with television images and particularly to such pulses as form a border within the limits of an image upon a camera viewfinder to denote the extent of the image seen by the television audience.

In television broadcasting it has become standard practice to provide a greater scope of scene before the camera upon the camera viewfinder than is transmitted to the television audience. This is so that the camera operator will have an opportunity to see such objects as are not to appear in the image intended for the audience. Such objects are the sound-pickup microphone, other cameras, lighting and stagecraft equipment, other actors, the edges of scenery, and so on. In order to obtain the best sound pickup the boom operator always positions the microphone as low as he can without it appearing at the top of the image transmitted to the audience. Thus, this object is necessarily an ever-present hazard. On the other hand, inclusion of the microphone, another camera, etc., even if only in part, is regarded as an "unpardonable sin" in television broadcasting and often leads to unfavorable reviews for the program involved. Since the whole broadcasting effort is directed toward entertaining (not distracting) the public and creating good will for the program sponsor it is seen that accuracy in framing the transmitted image has much greater importance than would ordinarily be considered.

It has been a long-standing practice to delineate the "limits" of the transmitted image upon the screen of the camera viewfinder by trial with the television camera system operating and the camera operator purposely orienting his camera until the monitor operator informs him over the intercommunicating telephone that the microphone has just entered the image intended for the audience. The limits at the bottom and at both sides of the image are similarly determined by additional separate tests. All this, of course, occurs before the start of the program proper.

Regardless of this activity there still exists reasonable uncertainty as to just where the limit of the audience image is located. Nearly all television camera equipment experiences "warm-up" effects. These invariably alter the size, position and/or linearity characteristics of the viewfinder image, its relation to the corresponding image formed upon the camera pick-up tube, and/or its relation to the image transmitted to the audience. This effect also negates advantages of an optical or of combined optical and cathode ray tube viewfinders.

In practice, the limits of the audience image are usually marked upon the outer glass of the viewfinder cathode ray image tube with a "grease" pencil. Variation of any one of the characteristics mentioned impairs the accuracy of the limits determination. Furthermore, there is often ambiguity in determining just when the microphone, etc. is in the audience image because of the necessity of relaying this information by telephone, also just what part of the chair, etc. is meant when the side limits are being determined.

This determination of limits is known as a bothersome and time-consuming process at the start of nearly every program. With the usual three cameras on the set the process must be repeated individually for each camera. A substantial dollar saving would be attributed to an arrangement that would eliminate this expenditure of time of the technical staff, of wasted hours of camera tube life and of insurance against recurring errors during the program caused by uncertainty of image limits.

For these reasons I was led to invent a completely automatic and constantly accurate means for indicating the limits of the transmitted image on all camera viewfinders, and this accomplishment is a major object of my invention.

Another object is to provide a viewfinder marker signal by employing relatively few and simple circuit components.

Another object is to provide a marker signal generator that utilizes to a considerable degree circuits which are present in usual television camera equipment, consequently simplifying the generator and insuring accurate coaction with the camera equipment.

Another object is to provide a viewfinder limits indicator that is not affected by warm-up of the equipment with which it is associated and which at all times accurately shows the limits of the image transmitted to the audience upon the camera viewfinders.

Another object is to provide a viewfinder limits indicator that can be switched to give a limits border either lighter or darker than the general brightness of the viewfinder image.

Figure 2:
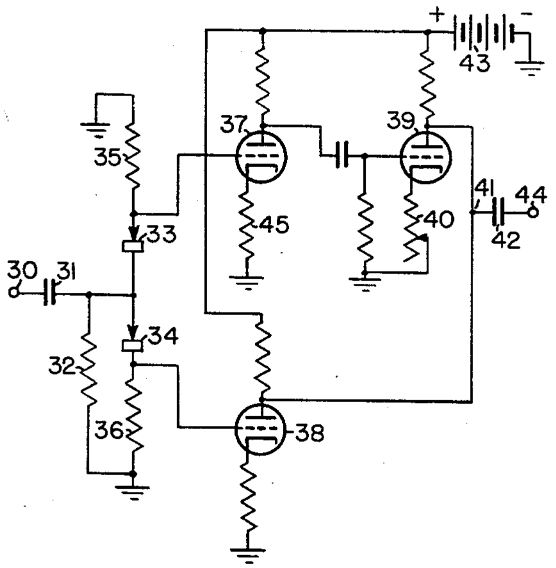
Figure 3:
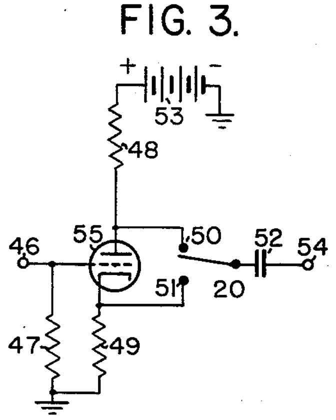

Other objects of my invention will become apparent upon reading the following detailed specification and upon examining the related drawings, in which:

Fig. 1 is a block diagram of the marker signal generator in relation to associated equipment and the electrical waveforms pertinent to the several parts thereof, Fig. 2 is the schematic diagram of the essence of my marker signal generator, and Fig. 3 is the schematic diagram of an additional amplifier stage that makes possible either darker or lighter border lines than the general brightness of the viewfinder image.

In accomplishing the objects of this invention use is made of the fact that blanking pulses are produced for the camera viewfinder, if not for other purposes as well, which are narrower than the blanking pulses produced for the image signal that reaches the television audience. In Fig. 1, numeral 1 identifies the source of viewfinder blanking. This has an output waveform 2, in which the pulse of long duration 3 is for vertical blanking and the short pulse 4 is for horizontal blanking; there being nearly three hundred of the latter before a recurrence of the former.

Similarly, numeral 5 identifies the source of standard blanking pulses of the general synchronizing equipment and this blanking is that transmitted to the television audience, as schematically indicated by a lead 6 labelled "To Transmitter." The output waveform of this source is shown at 7, in which the vertical blanking pulse is 8 and the horizontal is 9. By means of the vertical guide lines between waveforms 2 and 7 it is noted that pulse 3 is narrower than the corresponding pulse 8 and that pulse 4 is narrower than pulse 9, also, that the corresponding pulses are symmetrically related one to the other. In these waveforms the usual convention obtains, time progresses from left to right, positive voltage excursions are upward and negative excursions are downward.

It is to be noted that the pulses of waveform 7 start before and end after the pulses of waveform 2. This means that were it possible to obtain a narrow "spike" pulse at the start and at the end of the former pulses such spikes would provide a line marker at the sides and a dot marker top and bottom of the viewfinder image. The viewfinder image is terminated, of course, by the latter pulses. Such spike pulses are formed by a differentiating circuit 10, although in unwanted opposite directions at opposite sides of a given pulse as shown in waveform 11.

To make these pulses all lie on one side of an axis the two rectifier-amplifier entities 12 and 13 are employed. The rectifiers are oppositely connected so that only downward throws are passed by the rectifier of entity 12, as per waveform 14, while the opposite is true of entity 13, per waveform 15. Entity 12 having two stages of resistance-capacitance coupled amplification the phase of the output thereof is the same as that of the rectifier. Entity 13 having only one stage of amplification the phase is reversed with respect to that out of the rectifier. Hence, at the combined output, represented by waveform 16, all pulses are of one polarity and this output may be used for marking a viewfinder.

In certain embodiments of this invention it is desirable to have the marking be either dark or light, at will, and this is accomplished by adding phase-splitter stage 17. Here, by taking an output 18 from the plate of such a stage, positive (bright) pulses are secured, and by taking an otherwise equivalent output 19 from the cathode of the stage, negative (dark) pulses are secured. Either of these may be selected by means of switch 20 and thence conveyed to the image signal input of the viewfinder image reproducing tube 21 in camera 22, conductor 26 being employed.

Narrow viewfinder blanking pulses 2 from source 1 are also conveyed to the tube 21 by conductor 23 (or combined with the image signal itself). These determine the extent of the viewfinder image as indicated by perimeter 24 on the tube. Similarly, waveforms 18 or 19 give the marker lines 25 sought. The positions of lines 25 indicate the horizontal extent of the image seen by the audience and the lengths thereof indicate the vertical extent of the audience image. With interlaced scanning, which is almost universally employed in television, two additional dots 25' are located at the top and bottom of the audience image centrally with respect to lines 25 and at the same heights as the extremities thereof. These dots occur because the even numbered scanning lines start at the top and stop at the bottom in the center of the image in order that the interlaced pattern will be formed, as is known. In use, as long as the cameraman keeps unwanted objects beyond lines 25 and dots 25' by suitably orienting his camera the unwanted objects will not appear in the image seen by the audience.

Circuit details are shown in Fig. 2. Terminal 30 represents the input of the standard blanking waveform from source 5 of Fig. 1. Capacitor 31 is of high capacitative reactance at the frequency of operation and resistor 32 has a low value of resistance in comparison, this combination constituting a differentiating circuit for obtaining the first derivative of waveform 7. Without restricting my invention, a value of 270 micro-microfarads for the capacitor and 1,000 ohms for the resistor are suitable for usual broadcast television, the horizontal pulse frequency of which is 15,750 per second.

The output of the differentiating circuit, waveform 11, is rectified by oppositely poled diodes 33 and 34. These may be of the known germanium or silicon crystal types or may be vacuum tube diodes. Across grid-leak type resistor 35 rectified waveform 14 appears, while across resistor 36 waveform 15 appears. Vacuum tubes 37 and 38 and associated resistors comprise usual amplifier stages. These may be of any equivalent types, including transistors. Vacuum tube 39 is part of a generally similar amplifier stage, save that cathode resistor 40 is variable to alter the gain of that stage. The second amplifier stage is employed chiefly to reverse the phase of the pulses from stage 37 to that at resistor 35 so that the joint output point 41 finds all pulses in one direction, as shown by waveform 16. Capacitor 42 is the usual one of negligible reactance at the frequencies involved to remove plate potential from battery 43 from beyond the capacitor. The output terminal is 44. From here the output is normally conveyed to the camera proper, as by one conductor 26 in the camera cable which connects to the intensity control electrode of the viewfinder picture tube (usually the grid). The amplifiers and conductors described should be capable of passing the frequency band involved. This extends from 60 cycles, the fundamental of the vertical pulse, to the order of 100,000 cycles, the harmonics of the horizontal pulse.

In Fig. 3 there is shown what is required to obtain either a dark or a light limit border. Terminal 46 connects directly to terminal 44 of Fig. 2. Resistor 47 is the grid leak for the stage. Resistors 48 and 49 have equal values and thus provide equal amplitudes of pulses, waveforms 18 and 19, of opposite phase. These appear at switch points 50 and 51 of switch 20 and thus either may be selected by operating the switch. Capacitor 52 is again a coupling capacitor to remove direct voltages from battery 53 and terminal 54 is the final output terminal which is connected to conductor 26 when this stage is used.

The usual location for all the apparatus shown in Figs. 2 and 3, save the camera 22, is in the control or equipment room of a television studio. One apparatus is then capable of serving all cameras connected to the blanking source 5 of Fig. 1. The apparatus of this invention, of course, may be located in the camera involved if some other factor is compelling, in which case the line having the terminal 30 thereon is extended to the camera in place of conductor 26.

In some instances a source of viewfinder blanking, 1 of Fig. 1, is contained in each camera, being derived from the flyback energy of the viewfinder scanning circuits. This does not alter the embodiment of my invention. The duration of such blanking is purposely less than the duration of standard blanking. The application of my circuit gives the desired side line and top and bottom dot markers, indicating what the audience viewer sees.

My circuit is capable of certain modifications. As taught by the in-phase output from the cathode resistor 49 in Fig. 3, a cathode output may correspondingly be used for tube 37 by taking the output from resistor 45. In this case tube 39 is not required. However, the gain of both amplifier 37 and 38 must be adjusted to be slightly less than one, since the maximum voltage gain of a cathode output stage is less than one. This modification is suitable where high level blanking pulses are available and subsequent amplification as provided by the original circuitry is not required.

In a reciprocal manner a two-stage one-stage dual amplifier of the nature of stages 37, 39 vs. 38 may be employed to perform the phase splitting function of stage 55 in Fig. 3.

Similarly, batteries 43 and 53 may be replaced by the usual power supply. Vacuum tube heaters and the supply therefor have not been shown for sake of simplicity according to usual custom.

Multigrid vacuum tubes may be used instead of the triodes shown. The circuits of both Figs. 2 and 3 may be accomplished with two twin triodes.

The marker signals may also be applied to any other image in the studio, as on a monitor, and will give the border as long as the blanking signals utilized therewith are of the narrow kind.

Still other changes in circuit details, operating characteristics of components and frequencies involved may be made without departing from the scope of my invention as set forth in the accompanying claims.

Having now fully described my invention and the manner in which it is to be practiced, I claim:

1. A circuit for providing a border consisting of two vertical lines and two centrally located top and bottom dots within the limits of a first television image which correspond to the rectilinear extent of a second television image comprising first electronic means to form said first image, second electronic means to form said second image, a first source of blanking signal which determines the horizontal extent of said second image, a second source of blanking signal narrower than said first source, the signal of said second source applied to said first electronic means to determine the horizontal extent of said first image as being greater in both horizontal directions than the horizontal extent of the second image, electrical differentiating means connected to said first source of blanking signal to form differentiated pulses from said blanking signal, unilaterally conductive means connected oppositely to said differentiating means to suppress opposite polarities of said differentiated pulses, means to reverse the phase of one said polarity of said differentiated pulses with respect to the other and to combine the resulting differentiated pulses to form a series of pulses all of the same polarity in which only one pulse marks the occurrence of each change of amplitude of said blanking signal, said means-to-reverse connected to said unilaterally conductive means, and further means to apply said series of pulses to the means-to-form said first television image for forming said border.

2. A circuit coactive with one of two sources of blanking signals for providing a border-like indication within the geometrical limits of a first television image which corresponds to the geometrical limits of a second television image comprising a source of blanking signals which determines the limits of said second image, a differentiating circuit connected thereto, a first rectifier connected to said differentiating circuit, said first rectifier constituted to suppress one polarity of said differentiated pulses, a second rectifier also connected to said differentiating circuit, said second rectifier constituted to suppress the opposite polarity of said differentiated pulses, means to reverse the phase of one said polarity of said differentiated pulses with respect to the other and to combine the resulting differentiated pulses, said means connected to said rectifiers, further means to provide oppositely phased pulses from the combined differentiated pulses, switching means connected to said further means to allow selection of the phase of said combined differentiated pulses, and additional means to form said first television image a second source of blanking signals, means connecting said second source of blanking signals to said additional means, whereby said first television image is limited to a geographical extent which is greater than the geographical extent of said second television image, and means connecting said switching means to said additional means to provide said border-like indication either lighter or darker than the brightness of said first television image depending upon the switching effected by said switching means.

3. A circuit for providing a border indicator within a television image upon a viewfinder corresponding to the extent of a television image formed upon the screen of the usual viewer to provide a greater field of view upon the viewfinder comprising a source of blanking signals which determines said extent, a differentiating circuit connected to said source to form differentiated pulses from said blanking signals, a first rectifier connected to said differentiating circuit, said first rectifier constructed to suppress one polarity of said differentiated pulses, a second rectifier also connected to said differentiating circuit, said second rectifier constructed to suppress the opposite polarity of said differentiated pulses, a first phase-reversing amplifier connected to said first rectifier, a second non-phase-reversing amplifier connected to said second rectifier, means to equalize the amplitudes of said differentiated pulses, the outputs of said first and second amplifiers connected together and to a bi-phased amplifier having oppositely phased outputs, switching means, one pole of said switching means connected to one phase of output from said bi-phased amplifier and a second pole connected to the opposite phase thereof, electronic means to form said television image upon said viewfinder a second source of blanking signals, means connecting said second source of blanking signals to said electronic means whereby said television image upon said viewfinder is limited to a geographical extent which is greater than the geographical extent of the television image formed upon the screen of the usual viewer, and means connecting said switching means to said electronic means, whereby said border indicator is either lighter or darker than the brightness of said television image upon said viewfinder depending upon which pole of said switching means is connected to said electronic means.

4. A circuit for providing a partial border within the perimetrical limits of a television image upon a viewfinder corresponding to the limits of the television image formed upon the screen of the usual viewer to afford a greater field of view upon the viewfinder than upon the screen of the usual viewer, said circuit coactive with plural sources of blanking signals, comprising; a source of standard blinking signals to determine the limits of the image of the usual viewer, a source of narrower blanking signals to determine the limits of the viewfinder image, a series-capacitor shunt-resistor combination connected to said source of standard blanking signals to form differentiated pulses from said standard blanking signals, a first rectifier and a first resistor connected to said combination to suppress one polarity of said differentiated pulses, a second rectifier and a second resistor also connected to said combination, said second rectifier connected oppositely with respect to said first rectifier to suppress the opposite polarity of said differentiated pulses, first phase-reversing means connected to said first resistor, second non-phase-reversing means connected to said second resistor, means connecting the outputs of said first and second means together and to phase-splitter means having oppositely phased outputs, a switch having two contacts, one contact of said switch connected to one phase of output from said phase-splitting means and a second contact connected to the opposite phase from said phase-splitting means, means to form the television image upon a viewfinder, and means connecting said switch and said viewfinder to provide said partial border either lighter or darker than the brightness of the television image upon said viewfinder.

5. A circuit coactive with a source of standard and other blanking signals for providing a border of two vertical lines and two dots at the top and bottom within the limits of a television image upon a camera viewfinder corresponding to the limits of the television image formed upon the screen of the usual viewer to enable the camera operator to see objects in the image upon the viewfinder before such objects may enter the field of the image upon the screen of the usual viewer comprising electronic means producing an image upon the screen of the usual viewer, a source of standard blanking signals to determine the limits of the television image formed upon the screen of the usual viewer, a small series capacitor and a shunt resistor having a resistance value small with respect to the reactance of said small series capacitor at the operating frequency connected to said source of standard blanking signals, camera viewfinder electronic means to form an image upon said viewfinder, a second source of blanking signals narrower than the blanking signals of the first source, means connecting said second source of blanking signals to said camera viewfinder electronic means to limit the image of said camera viewfinder to a geographical extent which is greater than the geographical extent of the television image formed upon the screen of the usual viewer, said capacitor and said resistor adapted to form differentiated pulses from said standard signal, a first rectifier and a first resistor connected in series between the junction of said capacitor and said shunt resistor and ground to suppress one polarity of said differentiated pulses, a second rectifier connected in polarity opposite to said first rectifier and a second resistor also connected in series between said junction and ground to suppress the opposite polarity of differentiated pulses, a first amplifier of one stage connected to said first resistor, a second amplifier of two stages connected to said second resistor, resistive means to vary the amplification of said second amplifier to allow the amplitude of the differentiated pulses passing therethrough to be adjusted with respect to that of the differentiated pulses passing through said first amplifier, means connecting the outputs of said first and second amplifiers together and to a phase-splitter amplifier stage having plate and cathode resistors, from which one polarity of combined differentiated pulses is obtained from said plate resistor and the other polarity of said pulses from said cathode resistor, double throw switch means having alternative terminals connected to the plate and the cathode of said phase-splitter amplifier stage respectively, means connecting the common terminal of said switch means to said camera viewfinder electronic means, whereby said switch means allows a change of said polarity to produce said border either lighter or darker than the brightness of the image upon said camera viewfinder.

References Cited in the file of this patent

UNITED STATES PATENTS 2,210,523 Blumlein ---------------- Aug. 6, 1940

FOREIGN PATENTS 654,413 Great Britain ----------- June 20, 1951

OTHER REFERENCES

"Television Broadcasting," Chinn; McGraw-Hill Book Co., Inc., copyrighted 1953; pages 48, 49, 50.